United States Patent [19]
Pendalwar et al.

[11] Patent Number: 5,834,135
[45] Date of Patent: Nov. 10, 1998

[54] MULTILAYERED GEL ELECTROLYTE BONDED RECHARGEABLE ELECTROCHEMICAL CELL

[75] Inventors: Shekhar L. Pendalwar; Jason N. Howard, both of Lawrenceville; Ganesh Venugopal, Duluth; Manuel Oliver, Norcross, all of Ga.

[73] Assignee: Motorola, Inc., Schaumburg, Ill.

[21] Appl. No.: 937,298

[22] Filed: Sep. 27, 1997

Related U.S. Application Data

[62] Division of Ser. No. 835,894, Apr. 14, 1997, Pat. No. 5,716,421.

[51] Int. Cl.[6] .................................................. H01M 10/40
[52] U.S. Cl. ......................... 429/190; 429/192; 252/62.2
[58] Field of Search .................................... 429/190, 192, 429/144, 194; 252/62.2

[56] References Cited

U.S. PATENT DOCUMENTS

| | | | |
|---|---|---|---|
| 4,650,730 | 3/1987 | Lundquist et al. | 429/62 |
| 4,731,304 | 3/1988 | Lundquist et al. | 429/62 |
| 5,240,655 | 8/1993 | Troffkin et al. | 264/28 |
| 5,658,685 | 8/1997 | Oliver | 429/190 |
| 5,665,265 | 9/1997 | Gies et al. | 429/190 |

*Primary Examiner*—Anthony Skapars
*Attorney, Agent, or Firm*—Felipe J. Farley

[57] ABSTRACT

An electrochemical cell 10 includes first and second electrodes 12 and 14 with an electrolyte system 26 disposed therebetween. The electrolyte system includes at least a multilayered first polymeric region 28, having second layers 30 and 32, of a second polymer material. The second layers may absorb an electrolyte active species and to adhere the adjacent layer of electrode material to the electrolyte 26. The electrolyte system further includes a process for packaging and curing the electrolyte after it has been incorporated into a discrete battery device.

15 Claims, 5 Drawing Sheets

MULTILAYERED GEL ELECTROLYTE BONDED RECHARGEABLE ELECTROCHEMICAL CELL

This is a Divisional application under §1.60 of U.S. patent application Ser. No. 08/835,894 filed Apr. 14, 1997 and assigned to Motorola, Inc. now U.S. Pat. No. 5,716,421

TECHNICAL FIELD

This invention relates in general to the field of electrolytes for electrochemical cells, and more particularly to methods of making electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there has been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. The electrodes and a separator are bonded together in an environment devoid of the electrolyte salt. Thereafter, the solvent and the electrolyte salt may be introduced into the system in order to activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically highly hygroscopic) it offers problems with respect to performance and assembly. First, the gel electrolyte may lack sufficient mechanical integrity to prevent shorting between the electrodes while they are being bonded or laminated together with the electrolyte. The electrolyte layer thickness is reported to be 75 $\mu$m, presumably to overcome this shorting problem and to help facilitate handling of the electrolyte material. When compared to the 25 $\mu$m typical thickness for separators used in liquid lithium ion cells, this results in a significant reduction in the volumetric energy density for the cell.

Second, in order to create porosity in the polymer and electrode layers that will be used to absorb liquid electrolyte, a plasticizer is used. Unfortunately, the subsequent removal of this plasticizer to create the pores requires the use of flammable organic solvents. In addition to the safety hazard that is created, the time required for the solvent extraction process renders it relatively expensive. These problems are significant limitations to the successful implementation of gel electrolytes in electrochemical cells.

An additional issue facing lithium cells, whether fabricated by the process described above or not, is that of overheating or self heating which occurs upon, for example, exposure to excessive overvoltage during charging. For example, lithiated cobalt oxide materials used as the cathode of lithium ion electrochemical cells will begin to self heat after being exposed to overvoltage conditions sufficient to raise the internal cell temperature above about 180 degrees Centigrade. Once this threshold has been reached, the cell will continue to heat, degrading cell performance, and potentially posing a burn risk to the user of a device into which the cell is incorporated Accordingly, there exists a need for a new electrolyte system which combines the properties of good mechanical integrity, as well as the ability to absorb sufficient amounts of an electrolyte active species so as to produce an electrolyte system with the high ionic conductivity characteristic of liquid electrolytes. The electrolytes so formed should also avoid excessive swelling and all of the problems associated therewith. The electrolyte should also have the ability to shut a cell into which it is incorporated off, once a threshold temperature is reached, thus obviating the problems described above.

DETAILED DESCRIPTION OF THE PREFERRED EMBODIMENT

Figure 1:
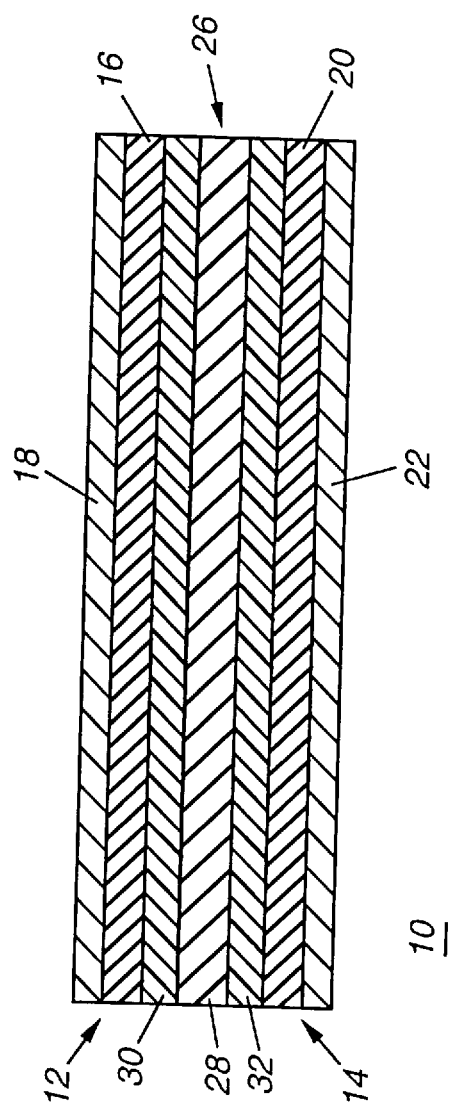
FIG. 1 is a cross sectional side view of an electrochemical cell in accordance with the invention.

While the specification concludes with claims defining the features of the invention that are regarded as novel, it is believed that the invention will be better understood from a consideration of the following description in conjunction with the drawing FIGS, in which like reference numerals are carried forward.

Referring now to FIG. 1, there is illustrated therein a cross sectional side view of a gel electrolyte bonded electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. pat. application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper. The second electrode 14 may be adapted to be the cathode of a lithium rechargeable cell. In such an instance, the cathode is fabricated of the lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, co-pending U.S. patent application Ser. No. 08/464,440 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of known materials known in the art, examples of which include aluminum, nickel, and combinations thereof. In one preferred embodiment, substrate 22 is fabricated of aluminum.

Disposed between electrodes 12 and 14 is a layer of an electrolyte material system 26. The electrolyte system 26 comprises an electrolyte active species and a polymer gel electrolyte support structure consisting of at least two different polymers. A first polymer is provided as an absorbing phase and the second polymer is provided as an inert phase. The inert phase 28 is provided to give mechanical integrity and structural rigidity to the electrolyte system. The absorbing phase 30, 32, which may be disposed on either or both sides of the inert phase, is adapted to engage the electrolyte active species therein. The gelling polymer may further act as a bonding paste to assist in adhering the electrodes to the inert polymer.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as. $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_3^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), acetone and combinations thereof. For other electrode combinations, i.e., Ni—Cd or Ni-metal hydride, other electrolyte active species may be used, such as KOH.

Figure 2:
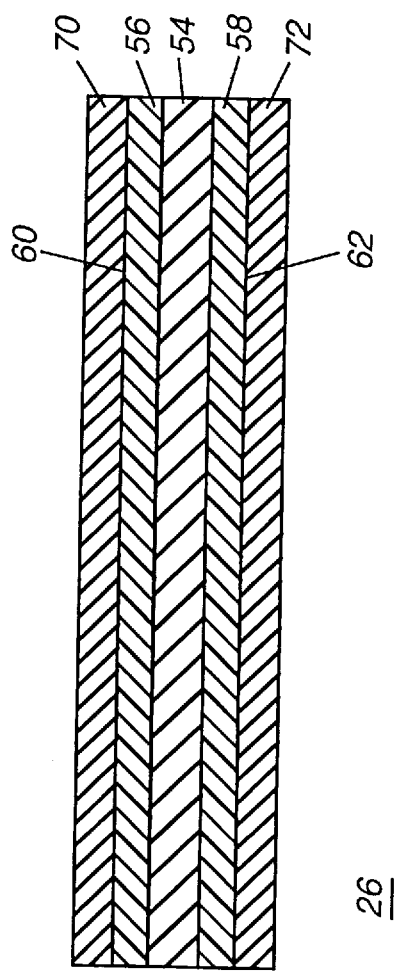
FIG. 2 is a cross-sectional side view of an electrolyte layer for use with an electrochemical cell, in accordance with the invention.

Referring now to FIG. 2, there is illustrated therein a cross-sectional side view of the electrolyte system 26 of FIG. 1. The electrolyte system 26 comprises a first polymer region 52 is a porous separator which is formed of one or more layers of inert polymer material. The term inert refers to the fact that the material itself is not absorbing, though the layer of material, due to its porosity (as described below) may be absorbing. In the preferred embodiment of the instant invention, the first polymer region 52 is actually a multilayered polymer region comprising two or more different polymers. In the embodiment of FIG. 2, the first region comprises three polymer layers, a first layer of a first polymer 54 sandwiched between two layers 56 and 58 of a second polymer. Alternatively layers 56 and 58 may be fabricated of different polymer materials.

The polymers from which layers 54, 56, and 58 may be fabricated are selected from the group of materials consisting of polyalkenes such as polyethylene, polypropylene, or other polymers such as polytetrafluroethylene, polyethyleneterephthalate, polystyrene, ethylene propylene diene monomer, nylon, and combinations thereof. In one preferred embodiment, layer 54 is fabricated of polyethylene, while layers 56 and 58 are fabricated of polypropylene.

First region 52 includes first and second major surfaces 60 and 62, respectively, and wherein disposed on at least one of the first and second major surfaces is a layer of an absorbing or gel-forming polymer 70. The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. As illustrated in FIG. 2, the layer of the second polymeric material 70 is disposed on surface 60 of region 52. A second layer 72 of a second polymeric material may be disposed on the second major surface 62 of region 52. The layers of gel forming polymer 70, 72 may be fabricated of the same or different materials, as described hereinabove.

An advantage of the instant system is that the layers of the first region 52, when heated above a threshold temperature, for example about 135 degrees Centigrade (° C.) for poly ethylene, the material melts and fuses essentially choking off all ionic conductivity. Thus, any continued application of, for example a overheating overcharge, will result in a fused polymer layer. This means an end of the applied charge voltage since the fused polymer cuts off all ionic conductivity between the electrodes. Thus, the heating ends, and a potentially undesirable situation is avoided. The benefit of providing the sandwiching layers of, for example, polypropylene, is to assure a continued electrical and physical barrier between the electrodes, since any contact would result in a short, and potentially the type of heating which is to be avoided. Poly propylene remains relatively intact up to about 165° C.

Returning to the layers of absorbing or gel forming polymer, such layers may alternatively be deposited on the electrodes, and subsequently put into contact with the first polymer region when the electrodes and the inert polymer are stacked together to complete the battery cell. More particularly, a layer of the absorbing polymer may be coated onto at least one surface 15 (of FIG. 1) of, for example, the cathode. Surface 15 is ultimately disposed adjacent the electrolyte system 26: Hence, when the first polymer region is arranged in stacked configuration with the electrodes, the absorbing polymer is disposed in contact with the first polymer region.

Figure 3:
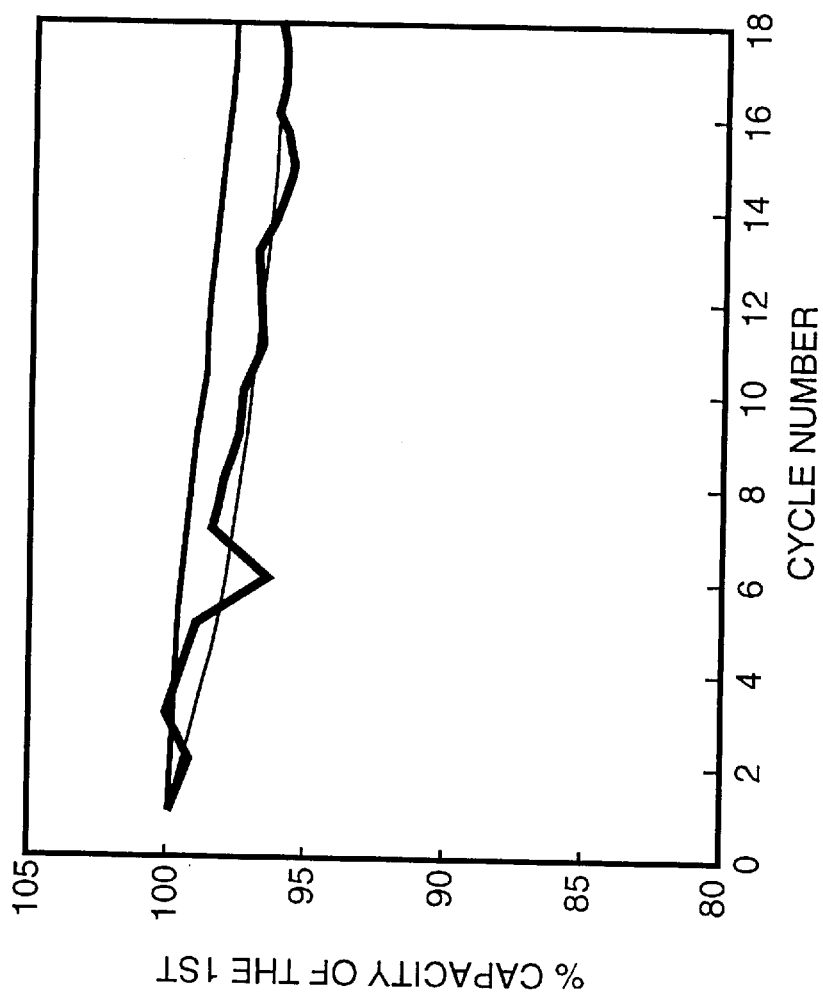
FIG. 3 is cycling data for electrochemical cells fabricated in accordance with the invention.

The electrodes and separator materials described above may be fabricated into electrochemical cells by winding and/or stacking the layers of electrode and separator material. Discrete cells are then packaged between sheets of a vapor impermeable package as is illustrated in FIG. 3. More particularly, discrete cell 90, is packaged between sheets of water vapor impermeable material such as metal foil laminates. Sheets 92 and 94 enclose the discrete package, or cell. Either before or after the package is sealed, the electrolyte active material, as described above, is injected into it.

The battery cell is then cured by exposing it both to a compression and heating step. More particularly, the packaged discrete battery cell is exposed to a temperature of between 50° and 150° C. for a period of time between 6 and 3600 seconds. The exact time will depend on the size of the cells themselves. The compression force used to bond and cure and battery pack is on the order of between 1 and 500 lbs/cm$^2$ and preferably between 50 and 100 lbs/cm$^2$. This heating and pressing step results in the absorbing polymer material being dissolved, along with the liquid electrolyte active species, wherein they seep or are forced into the pores of the inert polymer. When the cell cools and solidifies, or "gels" it serves the additional function of adhering the layers of electrode material to the separator.

The invention may be better understood from a perusal of the examples of which are attached hereto.

EXAMPLES

Example 1

Commercially available polypropylene, known as Celgard$^R$ 2300 was coated with PVDF by a dip coating process using an MEK/2-butanol solution. Three flat lithium ion polymer cells were built using the PVDF coated poly propylene and a standard electrolyte [60:40 EC/DEC/1M LiPF6]). The anode was fabricated of a commercially available graphite material, while the cathode was fabricated of a commercially available LiCoO2 material. The cells were cycled initially through 5 cycles (formation) and then through a further 20 cycles. The performance of these cells in general was similar to the standard cells. The cycling behavior is shown in FIG. 3. Two of these cells were then subjected to overcharge (@3C rate) safety tests. Performance was consistent with what would be expected for other cells.

Figure 4:
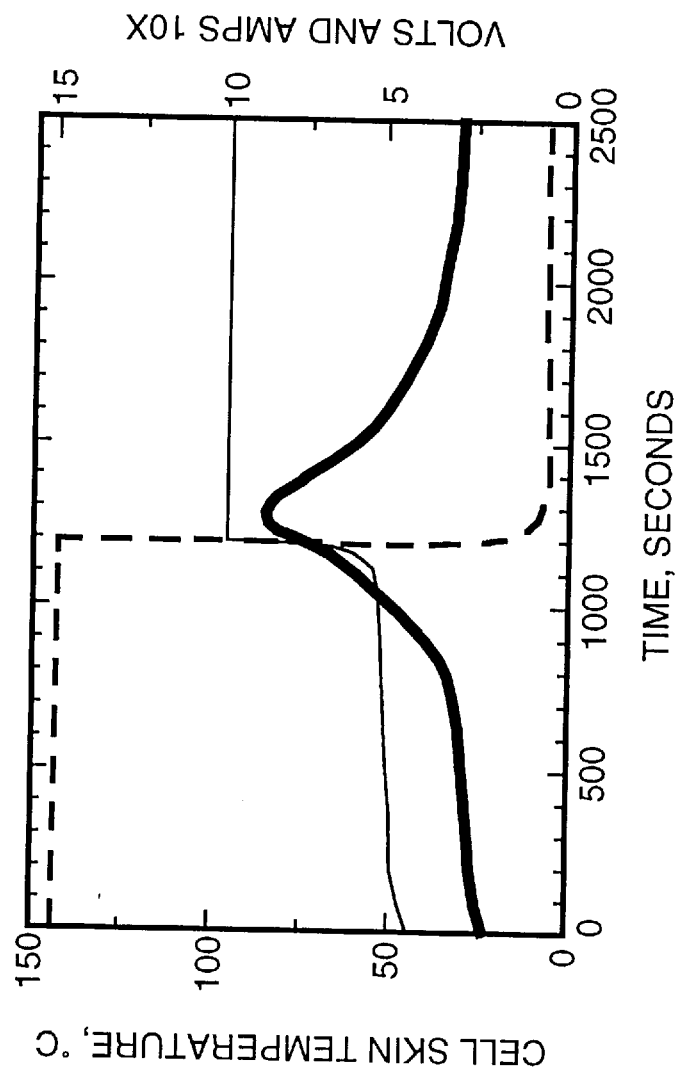
FIG. 4 is a chart illustrating thermal and voltage behavior of an electrochemical cell incorporating an electrolyte layer, in accordance with the invention.

The two cells were charged to 4.2 V at C/2 charge rate. The cells were then overcharged at 1.5 A (>3C) to a 10 V limit. Results are shown in FIG. 4. The cell skin temperature and cell voltage increased until the voltage was driven to the power supply limit (10 V). The current then dropped to a negligible value and the temperature returned to ambient. The low current confirms a large increase in cell impedance.

Figure 5:
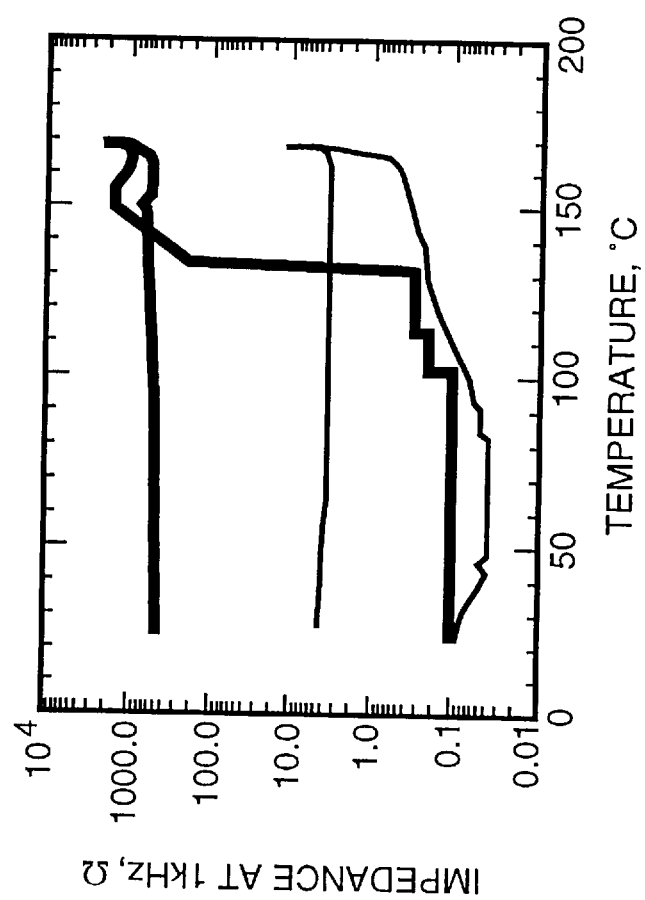
FIG. 5 is a temperature vs. impedence profile for an electrochemical cell incorporating an electrolyte layer, in accordance with the invention.

To confirm the "shutdown" properties of the two separators, the internal cell impedance vs. temperature was measured. (These tests were run on discharged cells for safety reasons, however, impedance differences between charged/discharged state are relatively small.) Cells were heated at 1° C./minute in a Thermotron from 25° to 175° C., followed by a "soak" at 175° C. for 10 minutes and then cooling to 25° C. @ 1° C. /min. Results for the trilayer and the conventional polypropylene materials are shown in FIG. 5. Two important conclusions can be made from FIG. 5:

1) "Shutdown" in the trilayer occurs at a much lower temperature (i.e., 135° C.); and
2) The impedance increase in the trilayer is substantially greater than in the polypropylene material. Since this large impedance will prevent virtually all current flow in the cell, the trilayer is expected to provide a much more effective shutdown mechanism than the polypropylene material alone.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system for a rechargeable electrochemical cell, said system comprising:

a porous separator element having at least a first and a second major surfaces, and fabricated as a multilayered polymer region, wherein the polymers of said multilayered region are selected from the group consisting of polyethylene, polypropylene, polytetrafluroethylene, polystyrene, polyethyleneterephthalate, ethylene propylene diene monomer, nylon, and combinations thereof;

a gelling polymer disposed on at least one major surface thereof, said gelling polymer selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof; and an electrolyte active species dispersed in at least said gelling polymer.

2. An electrolyte system as in claim 1, wherein said electrolyte active species comprises an electrolyte salt dispersed in an organic solvent.

3. An electrolyte system as in claim 2, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

4. An electrolyte system as in claim 2, wherein said electrolyte salt is selected from the group consisting of Cl$^-$, Br$^-$, I$^-$, ClO$_4^-$, BF$_4^-$, PF$_6^-$, ASF$_6^-$, SbF$_6^-$, CH$_3$CO$_2^-$, CF$_3$SO$_3^-$, N(CF$_3$SO$_2$)$_2^-$, C(CF$_3$SO$_2$)$_2^-$ and combinations thereof.

5. An electrolyte system as in claim 1, wherein said multilayered polymer region is formed of three layers.

6. An electrolyte system as in claim 5, wherein said three layers include a first polymer layer formed of poly ethylene disposed between layers of a second polymer.

7. An electrolyte system as in claim 6, wherein said layers of said second polymer are fabricated of poly propylene.

8. An electrochemical cell comprising:

an anode;

a cathode; and an electrolyte system comprising a porous separator element having at least a first and a second major surfaces, and fabricated as a multilayered polymer region, wherein the polymers of said multilayered region are selected from the group consisting of polyethylene, polypropylene, polytetrafluroethylene, polystyrene, polyethyleneterephthalate, ethylene propylene diene monomer, nylon, and combinations thereof, and further including a gelling polymer disposed on at least one major surface thereof, said gelling polymer selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof and an electrolyte active species dispersed in at least said gelling polymer.

9. An electrochemical cell as in claim 8, wherein said electrolyte active species comprises an electrolyte salt dispersed in an organic solvent.

10. An electrochemical cell as in claim 9, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

11. An electrochemical cell as in claim 9, wherein said electrolyte salt is selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof.

12. An electrochemical cell as in claim 8, wherein said multilayered polymer region is formed of three layers.

13. An electrochemical cell as in claim 8, wherein said gelling polymer is PVDF.

14. An electrochemical cell as in claim 12, wherein said multilayered polymer comprises a first polymer layer formed of poly ethylene disposed between layers of a second polymer.

15. An electrochemical cell as in claim 13, wherein said layers of said second polymer are fabricated of poly propylene.

* * * * *